(12) United States Patent
Michel et al.

(10) Patent No.: US 8,212,698 B2
(45) Date of Patent: Jul. 3, 2012

(54) ELECTRONIC CIRCUIT FOR CORRECTING AT LEAST ONE DIGITAL MEASUREMENT SIGNAL

(75) Inventors: Frank Michel, Rosbach v.d. Höhe (DE); Peter Oehler, Frankfurt am Main (DE); René Trapp, Föckelberg (DE)

(73) Assignee: Continental Teves AG & Co. oHG (DE)

( * ) Notice: Subject to any disclaimer, the term of this patent is extended or adjusted under 35 U.S.C. 154(b) by 144 days.

(21) Appl. No.: 12/678,860

(22) PCT Filed: Sep. 18, 2008

(86) PCT No.: PCT/EP2008/062490
§ 371 (c)(1),
(2), (4) Date: Jun. 1, 2010

(87) PCT Pub. No.: WO2009/040301
PCT Pub. Date: Apr. 2, 2009

(65) Prior Publication Data
US 2010/0231427 A1      Sep. 16, 2010

(30) Foreign Application Priority Data
Sep. 21, 2007   (DE) .......................... 10 2007 045416

(51) Int. Cl.
*H03M 1/12* (2006.01)
(52) U.S. Cl. ...................................... 341/142; 702/105
(58) Field of Classification Search .................. 341/142, 341/152
See application file for complete search history.

(56) References Cited

U.S. PATENT DOCUMENTS

| | | | | |
|---|---|---|---|---|
| 4,283,970 A * | 8/1981 | Vukovich | ...................... | 477/161 |
| 5,445,443 A * | 8/1995 | Hauser et al. | ................. | 303/137 |
| 5,901,176 A | 5/1999 | Lewison | | |
| 6,084,394 A * | 7/2000 | Windsheimer et al. | ........ | 324/130 |
| 2004/0078132 A1* | 4/2004 | Fey et al. | ......................... | 701/70 |
| 2004/0208225 A1 | 10/2004 | Otsuka | | |
| 2006/0044003 A1* | 3/2006 | Turner | .......................... | 324/769 |
| 2009/0299592 A1 | 12/2009 | Oehler | | |

FOREIGN PATENT DOCUMENTS

| | | |
|---|---|---|
| DE | 10 2004 0013 123 A1 | 10/2004 |
| GB | 2051979 A | 1/1981 |
| JP | 09247393 | 9/1997 |
| WO | WO2007080163 A2 | 7/2007 |

* cited by examiner

*Primary Examiner* — Howard Williams
(74) *Attorney, Agent, or Firm* — RatnerPrestia

(57) ABSTRACT

An electronic circuit for correcting at least one digital measurement signal ($\Sigma\Delta n$, $\Sigma\Delta 1$, $\Sigma\Delta 2$) comprising at least one measurement channel having a sigma-delta modulator and a correction circuit. The sigma-delta modulator changes an analog measurement signal into a digital measurement signal in the form of a binary value sequence. The correction circuit corrects the digital measurement signal ($\Sigma\Delta n$, $\Sigma\Delta 1$, $\Sigma\Delta 2$) as a function of at least one correction datum (trim), wherein the correction circuit comprises at least one adding element and at least one multiplexer. The digital measurement signal is corrected in that the correction datum (trim) is weighted by means of the multiplexer and the adding element as a function of the digital measurement signal ($\Sigma\Delta n$, $\Sigma\Delta 1$, $\Sigma\Delta 2$).

11 Claims, 2 Drawing Sheets

ELECTRONIC CIRCUIT FOR CORRECTING AT LEAST ONE DIGITAL MEASUREMENT SIGNAL

CROSS REFERENCE TO RELATED APPLICATIONS

This application is the U.S. national phase application of PCT International Phase Application No. PCT/EP2008/062490, filed Sep. 18, 2008, which claims priority to German Patent Application No. 10 2007 045 416.5, filed Sep. 21, 2007, the contents of such application being incorporated by reference herein.

FIELD OF THE INVENTION

The invention relates to an electronic circuit for correcting at least one digital measurement signal, and to the use of the electronic circuit in a motor vehicle braking system.

BACKGROUND OF THE INVENTION

Document WO 2007/080163 A2, which is incorporated by reference, proposes an electronic regulator for motor vehicle control systems, which in each case measures the current in the switch-on path and recirculation path in a PWM valve operating circuit, by means of a sense FET and a sigma-delta modulator, wherein the digital output signal from the sigma-delta modulators is in each case multiplied by a correction value or compensation factor in order to correct the respective digital measurement signal. This multiplication requires a multiplier circuit which is relatively complex and has a relatively large number of components.

SUMMARY OF THE INVENTION

An object of at least one aspect of the present invention is now to propose an electronic circuit for correcting at least one digital measurement signal, which has a relatively small number of electronic components and can therefore be produced relatively cost-effectively.

According to aspects of the invention, correcting at least one measurement signal is achieved by the electronic circuit as described herein.

In one or more embodiments, the invention relates to the idea of correcting a digital measurement signal comprising a binary value sequence by the correction operation or the signal processing which is required for digital correction being fed back with a digital correction data item to at least one addition process, and by the correction circuit having at least one multiplexer and at least one adding element. The use of at least one multiplexer and at least one adding element has the advantage over other signal processing circuits for correcting a digital signal that this correction circuit need have only relatively few electronic components, and is therefore relatively cost-effective. Furthermore, the chip area used for the correction circuit can be kept relatively small.

The correction data item is preferably a correction factor. Correction factors or trimming factors normally require a multiplication element which generally has considerably more electronic components, and therefore incurs higher costs.

The expression a correction data item preferably means a digital value, in particular a binary value, comprising a defined number of digits.

The expression a binary data sequence expediently means a bit sequence or a bit stream.

It is expedient for the electronic circuit to be part of an electronic regulator for motor vehicles, in particular of an electronic regulator according to document WO 2007/080163 A2, and for the sigma-delta modulator to convert an analog measurement signal of a load current, which flows through an essentially inductive load on a valve operating circuit, to a digital measurement signal, wherein the valve operating circuit regulates this load current by means of pulse-width modulation. The analog measurement signal is in this case provided directly or indirectly by at least one sense FET.

A binary null word and the correction data item are preferably applied to the inputs of the multiplexer, with the digital measurement signal operating the select input of the multiplexer. In this case, the output of the multiplexer is connected directly or indirectly to a first input of the adding element, and the correction circuit additionally has at least one first register, whose input is connected to the output of the adding element and whose output is connected to a second input of the adding element.

The digital measurement signal can preferably be subdivided into digital partial measurement signals or comprises a plurality of digital partial measurement signals, which each comprise a binary value sequence of defined length, or correspond to such a sequence.

The expression a null word preferably means a digital value whose bits all have the value "0".

The expression a digital measurement signal expediently also means a digital partial measurement signal.

It is preferable for the respectively corrected digital partial measurement signal, which is stored in the first register at the end of a respective correction cycle, to be stored in a second register and for the store content of the first register to be reset and/or deleted by means of a reset input essentially simultaneously in order to carry out a new, subsequent correction cycle, which reset input is operated as a function of the application of a new, subsequent digital partial measurement signal to the select input of the multiplexer.

The electronic circuit expediently has two measurement channels, whose digital measurement signals, which each comprise digital partial measurement signals, are transmitted to the correction circuit, which comprises a first multiplexer, a second multiplexer and a third, common multiplexer as well as at least one adding element and a first register, where the respective digital partial measurement signal in the first channel operates the select input of the first multiplexer, and the respective digital partial measurement signal in the second channel operates the select input of the second multiplexer, to whose inputs the correction data item and a binary null value are in each case applied, wherein the outputs of the first multiplexer and of the second multiplexer are applied to the inputs of the third multiplexer, whose select input is operated by a phase signal and whose output is connected to the first input of the adding element, wherein the second input of the adding element is connected to the output of the first register, and the output of the adding element is connected to the input of the first register. In particular, the first measurement channel is associated with a switch-on path, and the second measurement channel is associated with a recirculation path of the single or the respective pulse-width modulation valve operating circuit. The time profile of the phase signal is dependent on the time profile of the pulse-width modulation, as a result of which the respective switch-on time and the respective active time of both measurement paths are particularly preferably weighted. In this case, the third, common multiplexer is very particularly preferably operated essentially alternately, and therefore allows correction of the digital measurement signals in both measurement channels.

In addition, the correction circuit preferably in each case has an adding element, which is connected downstream from the output of the first and second multiplexers, and registers, in particular jointly in the form of counters, for additional separate correction of the digital measurement signals in the first and the second measurement channels.

An adding element and a register which is connected directly to it preferably in each case form a counting element or an averaging device, which in particular corresponds to a first-order digital low-pass filter.

The one or more registers is or are preferably operated in a clocked form.

The electronic circuit has a correction circuit which offers the capability for correction or trim of at least one digital measurement signal. This trimming or correction is preferably configured in a test mode, for example in the course of production or subsequent testing of the electronic circuit or of the electronic device or system which has the electronic circuit. A defined electrical test signal is expediently used to test the measurement channels, and is measured. A digital correction value or a correction data item results from the discrepancy between the resultant digital measurement signal and the test signal, and is preferably a correction factor or trimming factor which, in particular multiplied by the digital measurement signal, results in the respective test signal.

The invention also relates to the use of the electronic circuit in a motor vehicle braking system.

The electronic circuit according to aspects of the invention is preferably used to adjust the hydraulic pressure in the wheel brakes of the motor vehicle in electronic motor vehicle braking systems in which electromagnetic hydraulic valves are operated via pulse-width modulation in valve operating circuits. Alternatively, use in a servo-assisted steering system of a motor vehicle is envisaged, with the electronic regulator according to apects of the invention operating the at least one hydraulic valve.

DETAILED DESCRIPTION OF THE PREFERRED EMBODIMENTS

Figure 1:
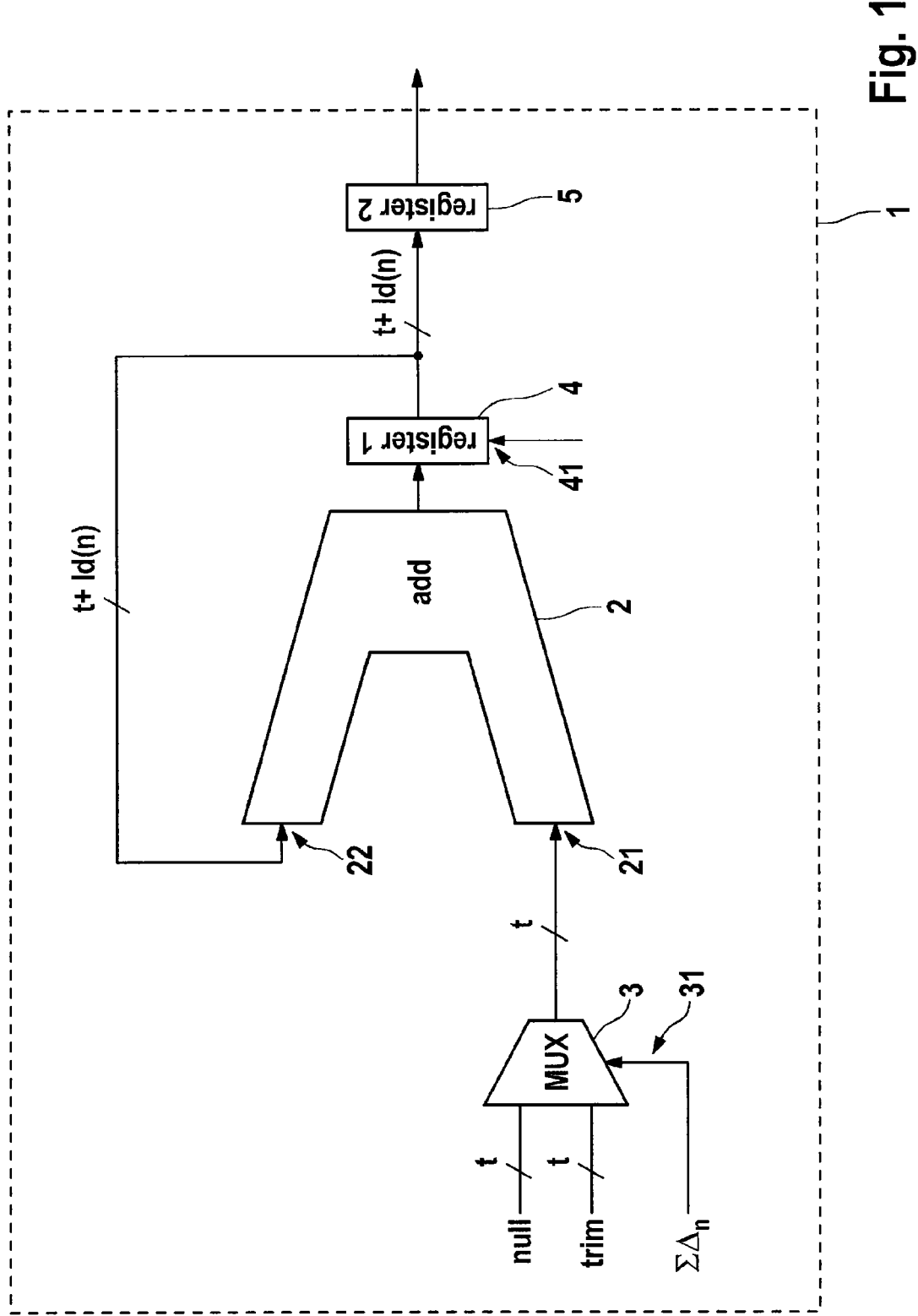
FIG. 1 shows one exemplary embodiment of the correction circuit for correcting the digital measurement signal in a measurement channel.

FIG. 1 shows an example of a correction circuit 1 in which a digital partial measurement signal in the form of a binary value sequence $\Sigma\Delta_n$ of length n, in a measurement channel of the electronic circuit, is corrected. The digital partial measurement signal $\Sigma\Delta_n$ or the binary value sequence $\Sigma\Delta_n$ operates the select input 31 of the multiplexer 3, to whose inputs a t-digit correction data item trim and a t-digit binary null value null are applied. When the partial measurement signal $\Sigma\Delta_n$ is "1", the data word of the correction data item trim is passed on or selected, and if the partial measurement signal $\Sigma\Delta_n$ is a "0", null is passed on or selected. The output of the multiplexer 3 is applied to the first input 21 of the adding element 2. The output side of the adding element 2 is connected to the input of the first register 4, which is fed back via the output on the input side 22 to the adding element 2. The register 4 comprises t+Id(n) digits and can store just as many digits, and the adding element 2 can correspondingly add t+Id(n)-digit binary summands. The multiplication of the, by way of example, binary correction factor or correction data item trim by the binary value sequence $\Sigma\Delta_n$ is therefore carried out by means of a plurality of additions, with the correction factor being weighted as a function of the binary value of each digit in the binary value sequence, and with an addition cycle of n clock cycles being carried out with the respectively selected data items trim or null. The adding element 2 and the first register 4 in this case essentially correspond to a counter. After n clock cycles in each case, the corrected partial measurement signal or the corrected binary value sequence is thus stored in the first register 4, after which the store content of the first register 4 is transmitted by means of a reset input 41 to the second register 5, and this is at the same time deleted in order to carry out the subsequent, next correction cycle. The store content of the register 5 is available for further signal processing of the respective corrected partial measurement signal.

Figure 2:
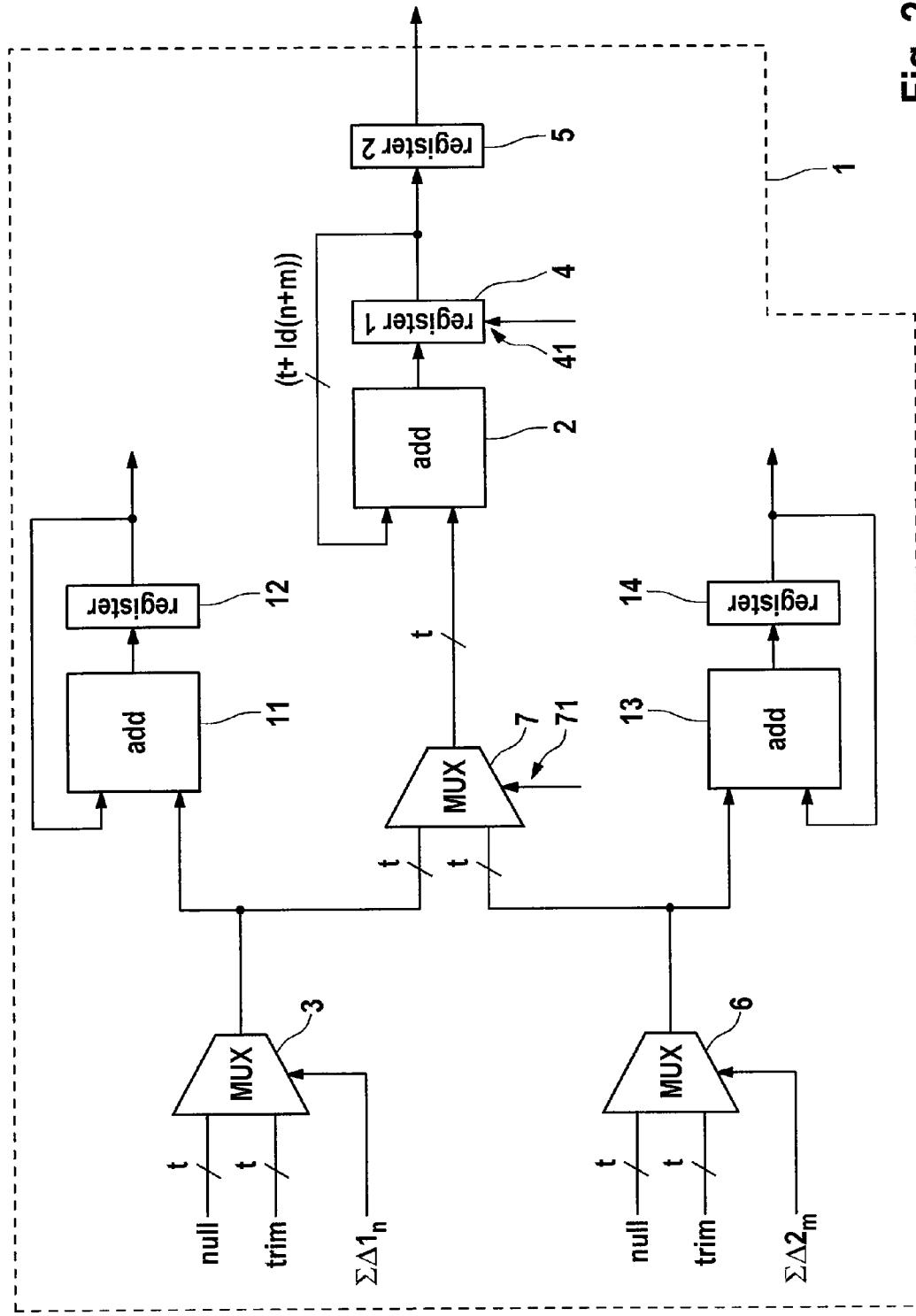
FIG. 2 shows an example of a correction circuit for jointly and separately correcting the digital measurement signals in two measurement channels.

FIG. 2 shows one exemplary embodiment of the correction circuit 1, which corrects the digital measurement signals or partial measurement signals $\Sigma\Delta 1$ and $\Sigma\Delta 2$ from two measurement channels, which are associated on the one hand with the switch-on path and on the other hand with the recirculation path of a PWM valve operating circuit. The respective digit or the respective bit in the digital binary partial measurement signals $\Sigma\Delta 1$ and $\Sigma\Delta 2$ with n or m bits selects the correction data item trim when a "1" is applied to the select input of the respective multiplexer 3 and 6, and selects the binary null word null when a "0" is applied. The respective output signal from the two multiplexers 3 and 6 is transmitted both to the inputs of a common multiplexer 7, that is to say also to two separate counter elements for separate correction of the two individual digital partial measurement signals $\Sigma\Delta 1$ and $\Sigma\Delta 2$, comprising an adding element 11, 13 with a register 12, 14 with feedback. The multiplexer 7 is operated by the phase signal 71 which, by way of example, is a binary signal whose respective value is dependent on which measurement channel is active and/or whether the recirculation path or the switch-on path is active. The multiplexer 7 thus, by way of example, essentially alternately passes on the two input signals and transmits them to the adding element 2 and the first register 4 which, as explained in FIG. 1, form a correction signal. This correction signal, which is stored in the first register 4 and is transmitted to the second register 5 after passing through a correction cycle, may alternatively comprise a corrected partial measurement signal for one channel or, for example, a common corrected measurement signal, in each case comprising a corrected partial measurement signal for both measurement channels. The adding element 2 and the first and second registers 4 and 5 are designed appropriately for processing and/or storing (t+Id(n+m))-digit data words. A correction cycle of the elements 2 and 4 therefore lasts for n+m clock cycles, and comprises a switching process of the multiplexer 7 by the phase signal 71.

The invention claimed is:

1. An electronic circuit for correcting at least one digital measurement signal, the electronic circuit comprising:
   a multiplexer for selecting between outputting a binary null data and a correction data based on N binary values of the digital measurement signal;
   an adder for computing a summation by adding the selected data output by the multiplexer with a previous summation computed by the adder;
   a register for storing the summation computed by the adder, wherein the adder iteratively computes a respective summation for each of the N binary values, and the electronic circuit outputs one of the respective summations for a selected one of the N binary values as a weighted correction data for correcting the digital measurement signal.

2. The electronic circuit as claimed in claim 1, wherein the correction data is a correction factor.

3. The electronic circuit as claimed in claim 1,
wherein the electronic circuit is part of an electronic regulator for motor vehicle control systems, and a sigma-delta modulator in the electronic circuit converts an analog measurement signal of a load current, which flows through an inductive load on a valve operating circuit, to a digital measurement signal, wherein the valve operating circuit regulates this load current by pulse-width modulation, and wherein the analog measurement signal is provided by at least one sense field effect transistor (FET).

4. The use of the electronic circuit as claimed in claim 1 in a motor vehicle braking system.

5. An electronic circuit for correcting at least one digital measurement signal,
wherein the electronic circuit has at least one measurement channel with a sigma-delta modulator, which converts an analog measurement signal to a digital measurement signal in the form of a binary value sequence, and a correction circuit which corrects the digital measurement signal as a function of at least one correction data item, wherein the correction circuit comprises at least one adding element and at least one multiplexer, wherein the digital measurement signal is corrected by weighting the correction data item by means of the multiplexer and the adding element, as a function of the digital measurement signal, and
wherein the correction data item and a binary null word are applied to the inputs of the multiplexer, and the digital measurement signal operates the select input of the multiplexer, wherein the output of the multiplexer is connected directly or indirectly to a first input of the adding element, and the correction circuit additionally has a first register, wherein the first register's input is connected to the output of the adding element, and the first register's output is connected to a second input of the adding element.

6. The electronic circuit as claimed in claim 5, wherein the digital measurement signal is divisible into digital partial measurement signals ($\Sigma\Delta_n, \Sigma\Delta 1, \Sigma\Delta 2$) which each comprise a binary value sequence of defined length, and the number of clock cycles (n, 2n) in which the correction circuit corrects the respective digital partial measurement signal corresponds to the number of binary digits in the correction data item.

7. The electronic circuit as claimed in claim 6, wherein the respectively corrected digital partial measurement signal, which is stored in the first register at the end of a respective correction cycle, is stored in a second register, and the store content of the first register is reset and/or deleted by means of a reset input essentially simultaneously in order to carry out a new, subsequent correction cycle, which reset input is operated as a function of the application Of a new, subsequent digital partial measurement signal ($\Sigma\Delta_n, \Sigma\Delta 1, \Sigma\Delta 2$) to the select input of the multiplexer.

8. An electronic circuit for correcting at least one digital measurement signal,
wherein the electronic circuit has at least one measurement channel with a sigma-delta modulator, which converts an analog measurement signal to a digital measurement signal in the form of a binary value sequence, and a correction circuit which corrects the digital measurement signal as a function of at least one correction data item, wherein the correction circuit comprises at least one adding element and at least one multiplexer, wherein the digital measurement signal is corrected by weighting the correction data item by means of the multiplexer and the adding element, as a function of the digital measurement signal, and
wherein this circuit has two measurement channels, whose digital measurement signals, each comprise digital partial measurement signals ($\Sigma\Delta_n, \Sigma\Delta 1, \Sigma\Delta 2$) in the form of binary value sequences of defined length, are transmitted to the correction circuit, having a first multiplexer, a second multiplexer and a third, common multiplexer as well as at least one adding element and a first register, wherein the respective digital partial measurement signal ($\Sigma\Delta 1$) in the first channel operates the select input of the first multiplexer, and the respective digital partial measurement signal ($\Sigma\Delta 2$) in the second channel operates the select input of the second multiplexer, to whose inputs the correction data item and a binary null value are in each case applied, wherein the outputs of the first multiplexer and of the second multiplexer are applied to the inputs of the third, common multiplexer, whose select input is operated by a phase signal and whose output is connected to the first input of the adding element, wherein the second input of the adding element is connected to the output of the first register, and the output of the adding element is connected to the input of the first register.

9. The electronic circuit as claimed in claim 8, wherein the first measurement channel is associated with a switch-on path, and the second measurement channel is associated with a recirculation path, of the or one of the pulse-width modulation valve operating circuit or circuits, and the time profile of the phase signal is dependent on the time profile of the pulse-width modulation.

10. The electronic circuit as claimed in claim 9, wherein the third, common multiplexer is operated essentially alternately and allows correction of the digital measurement signals in both measurement channels.

11. The electronic circuit as claimed in claim 9, wherein the correction circuit additionally in each case has an adding element, which is connected downstream from the output of the first multiplexer and the output of the second multiplexer, and registers for additional separate correction of the digital measurement signals in the first and the second measurement channels.

* * * * *